Feb. 10, 1970 J. S. DAVIS ET AL 3,495,225

MAGNETIC WOVEN MEMORY STRUCTURES

Original Filed Aug. 30, 1960 4 Sheets-Sheet 1

INVENTORS
JOHN S. DAVIS
BY PAUL E. WELLS
Fulwider and Noyuki
ATTORNEYS

INVENTORS
JOHN S. DAVIS
PAUL E. WELLS
BY
Fraser and Bogucki
ATTORNEYS

INVENTORS
JOHN S. DAVIS
PAUL L. WELLS
BY Fraser and Bogucki
ATTORNEYS

MAGNETIC WOVEN MEMORY STRUCTURES

Original Filed Aug. 30, 1960 4 Sheets-Sheet 4

INVENTORS
JOHN S. DAVIS
PAUL E. WELLS
BY Fraser and Bogucki
ATTORNEYS 3,495,225

MAGNETIC WOVEN MEMORY STRUCTURES

John S. Davis, Glendale, and Paul E. Wells, Santa Barbara, Calif.; said Davis assignor to Interco, Inc., a corporation of Maryland Continuation-in-part of application Ser. No. 380,982, June 29, 1964, which is a continuation of application Ser. No. 53,008, Aug. 30, 1960. This application Oct. 23, 1965, Ser. No. 503,614
Int. Cl. G11c *11/14*
U.S. Cl. 340—174 29 Claims

ABSTRACT OF THE DISCLOSURE

Woven memory apparatus utilizing remanently magnetic material as a storage medium in various configurations comprising pairs of intertwisted filaments on which the magnetic material is deposited.

This invention relates to information storage devices and more particularly to structures and fabrication methods relating to such devices which comprise a remanent magnetic material deposited on or otherwise carried by selected portions of a substrate composed of intermeshed or interwoven filamentary members.

This application is a continuation-in-part of application Ser. No. 380,982, filed June 29, 1964, now Patent 3,300,767, which in turn was a continuation of application Ser. No. 53,008, filed Aug. 30, 1960, now abandoned.

Modern computers and data processing systems depend to a large degree upon information storage devices. For obvious reasons, such information storage devices may commonly be referred to as memories. In most cases, it is desired that a suitable memory exhibit the properties of large storage capacity in small volume with rapid and easy access to stored information in both the storage and readout portions of the operating cycle. In addition, it is desired that such a memory device be economical to produce and absolutely reliable in operation.

A substantial proportion of previously known memory devices utilize the property of magnetic remanence as the storage mechanism, and considerable development effort has gone into providing memory devices employing magnetic cores, magnetic thin films and the like. However, certain disadvantages inherent in each of these respective types of devices have precluded their universal acceptance as an ideal information storage device. Toroidal ferrite cores provide desirable operating characteristics for information storage, but the problem of fabricating substantial pluralities of such cores to form a unified matrix renders the cost of such a matrix comparatively high. Magnetic thin film devices, on the other hand, may readily be fabricated by mass production techniques, but they lack the desirable magnetic properties which render the ferrite cores superior as storage elements.

Screen memory devices have been developed which give promise of combining the desirable magnetic storage properties of ferrite cores with the mass production fabrication techniques of the thin film devices, while eliminating the disadvantages inherent in each type. Basically, the screen memory devices typically comprise a substrate in the form of a screen mesh on which is carried a magnetic material preferably exhibiting remanent magnetic properties. The mesh may be comprised of a plurality of filamentary members which are interspersed, interwoven, or otherwise intermeshed with one another by any suitable means such as automatic weaving or knitting machines or by hand. Since, as will hereinafter become more apparent, it is not germaine to the present invention as to how the various filamentary members of the substrate are caused to intermesh, intertwine, intersperse, or interweave one another, the term "weaving" will be employed to represent any method for assembling the filamentary members to produce the desired form of substrate or mesh will for convenience be referred to as a woven mesh or screen. Each individual mesh of the screen may comprise a single cell having a closed magnetic path about its periphery. Control conductors are intertwined with the substrate filaments to thread selectively the individual cells so that information storage and readout may be effected. Devices of this type are generally described in the AFIPS Conference Proceedings, vol. 24, 1963, Fall Joint Computer Conference, pp. 311–326. The devices therein described employ essentially a basket weave, otherwise referred to as a plain, or over-under, weave. To reduce unwanted interference between adjacent cells which would otherwise share a common rail or magnetic path leg between them, buffer cells may be provided extending between adjacent rows or columns of cells. The buffer cells may contain one or more idler or dummy filaments to develop the desired spacing between the adjacent storage cells and also to control the direction in which the control wires are made to thread the storage cells from cell to cell.

Certain special types of woven memory devices may be provided for particular purposes and, for example, may depart from dependence upon magnetic remanence as the information storage mechanism. Devices in accordance with this example may instead employ selective variation in the inductive coupling between interwoven control wires as an information storage pattern, thus in some cases providing a truly permanent memory, as where the variation in coupling is provided by means of selective positioning of a magnetic layer in selected ones of the individual storage cells or by the selective threading of the various storage cells of the individual control conductors.

In other examples of woven memory devices, particularly those which are adapted for nondestructive readout of stored information, the storage cells may be defined by the crossings of respective control conductors with the closed loop magnetic path being provided to store flux in a cylindrical configuration about one of the crossing conductors of an individual cell, rather than in a longitudinal direction about a closed loop encompassing the crossing conductors.

Most of the weave patterns which have been developed for such woven screen memory devices require the use of a greater number of harnesses and shuttles than are available on commercial wire looms. Moreover, weaving structures of the types described necessitates close control of the tension of the respective filaments being woven in order to prevent damage to wire insulation resulting in short-circuiting between conductors of individual cells and to achieve desired uniformity in cell packing densities. With the use of even finer filaments in the woven memory structures, application of the desired tension to achieve higher uniform packing densities often results in rupture of the insulation with the destruction of matrix rows and columns being caused by short-circuits between crossing conductors.

Furthermore, the techniques employed in weaving so-called plain weave matrices, wherein each individual storage cell comprises four or more rails or legs, are not readily adaptable to modern automatic looms. These woven structures require a pick and pick operation but, although it is highly desirable to weave memory planes on cloth fabric looms, such looms of today employ but a single pick operation to which fabric designers have had to adapt their designs.

It is therefore a general object of the present invention to provide an improved memory matrix.

It is a further object of the present invention to provide an improved woven memory structure.

It is a more particular object of the present invention to provide a woven memory device having an improved cell configuration with improved operating characteristics.

It is also a particular object of the present invention to provide improved methods of fabricating woven memory structures.

A further object of the present invention is to provide a woven memory structure having increased storage cell density with better control of the relative positions of the filaments comprising the woven structure.

A further object of the present invention is to provide a woven memory structure having reduced interference between adjacent cells during the operation of the woven memory matrix.

An additional object of the present invention is to provide a woven memory structure which may readily be fabricated on standard automatic looms or other fabric forming machinery without requiring modification.

In brief, the present invention relates to woven memory structures providing a matrix of memory cells which may be fabricated by weaving a plurality of filaments in a selected pattern. On particular, arrangements in accordance with the invention utilize a plurality of substrate filaments intertwisted by pairs with associated other filamentary members, generally insulated electrical conductors, so that the other filamentary members are advantageously locked in place in the matrix. This type of weaving is generally designated as crossed weaving, but it may be commonly referred to as a gauze or a leno weave when it is employed in connection with the weaving of fabrics. The intertwisted substrate filaments are selectively coated with a magnetic material to establish a plurality of storage cells, with the magnetic material being configured to provide a closed loop path for magnetic flux.

Particular embodiments of the present invention may utilize a remanent magnetic material as the storage medium; and, of these, certain embodiments may comprise storage cells defined by portions of two intertwisted substrate filaments coated with remanent magnetic material to provide closed loop magnetic paths for longitudinally directed flux extending along the intertwisted portions encircling the associated control conductors threading the cell. Others may comprise individual storage cells in which the closed flux paths extend circumferentially about at least one of the intertwisted filaments, which is itself a current-carrying conductor. All of these arrangements, however, are fabricated by weaving in a crossed weave pattern, thus providing memory structures which are advantageously adapted to weaving on modern automatic looms.

On the other hand, other fabric forming machinery, such as automatic knitting machines, may be employed to produce the so-called maline weave, where the locking action of the aforementioned intertwisted pairs of filaments is effectively provided by a single filament which is stitched around groups of other filaments to form the substrate and with the loop formed by the locking stitch defining individual magnetic cells.

The use of such weave patterns in accordance with the present invention for the fabrication of a magnetic memory structure presents particular advantages. For example, this particular arrangement and the attendant method of fabrication eliminate or minimize deviations in dimension from cell to cell in a given matrix. As a result, more uniform cell openings are provided for the individual cells and undesired masking of a substrate filament by other filaments interwoven therewith is reduced or eliminated. As a consequence, a considerable improvement in uniformity of cell quality is realized. Moreover, a greater versatility in the types of cell configurations involving various storage and control arrangements is provided than was heretofore possible. A lesser number of loom harnesses and shutters may be employed so that the desired magnetic memory matrices may be woven on automatic looms of less complicated construction. In particular, the need for modifying such looms to provide pick and pick operation is eliminated.

Woven memory devices in accordance with the present invention may be fabricated simply on a cloth loom. In particular arrangements in accordance with the invention, each shoot or weft filament is locked in place by two warp filaments which wrap around the successive weft filaments in opposite directions. This is accomplished by the use of a special heddle, known as a leno heddle, which effectively works on adjacent pairs of warp filaments so that on each pick cycle the second filament of a pair is above or below the first filament. During each exchange, one or more pick or shoot filaments are woven, and each shoot filament thus becomes locked by the pairs of adjacent warp filaments which alternate in direction. The warp filaments form an almost elliptical pattern around the shoot filament and establish the closed loop path for magnetic flux when coated with a suitable layer of magnetic material. Thus a particular cell configuration may be provided which is elliptical in shape and which contains little or no space within the cell which is not taken up by control conductors. Since all of the substrate filaments extend in the warp direction, a loom with a single shuttle can be used for the control conductors extending in the weft or shoot direction. Moreover, such a cell configuration achieves a drastic reduction in path length over that which was available in the substantially square or rectangular cell provided by the plain weave type of woven memory cell. Furthermore, the control of path length is divorced from the control of tension which is applied to the insulated conductor filaments during weaving. In the present arrangements, the substrate filaments can be wrapped around the insulated conductors so that the filament diameter effectively determines all uniformity. Moreover, the insulated conductors can be woven with much less tension and thus reduce the insulation damage problem that is present in the fabrication of plain weave structures. The inductance of the crossed weave structures is substantially less in one direction than that presented by plain weave memory devices. Furthermore, the provision of an elliptical cell outline eliminates or reduces the effect of common rails between adjacent cells in the various orthogonal directions which have been present in prior woven structures. As most, each cell shares a fillet with an adjacent cell in the same warp direction, but even this common element can readily be eliminated, if desired, by the provision of an extra twist in the intertwisted substrate filaments between adjacent cells so as to establish buffer cells providing complete decoupling between adjacent storage cells. There is, of course, no common coupling element between cells in the weft direction. The increased latitude in locating the control conductors of a group of adjacent cells permits additional noise cancellation between cells which was not hitherto available in a single matrix. In general, the use of a crossed weave pattern in fabricating woven memory devices results in a substantial reduction of the limiting parameters which control the types of looms and weaving processes employed, the tensions applied during fabrication, the operating currents and conditions which are associated with the cells in operation, and the spacing and other interrelationships of the cells within a matrix and in adjacent matrices.

Particular arrangements in accordance with the invention may comprise a plurality of orthogonally arranged insulated conductors with pairs of substrate filaments intertwisted in the warp direction to lock the insulated conductors in position at the crossings thereof and to define the cell outline. In one particular arrangement, the substrate filaments alternate back and forth across the warp conductors to enmesh the respective weft conductors. In another particular arrangement in accordance with the invention, the intertwisted filaments are spirally wound around the warp conductors to effectively lock the respective conductors in the desired positions. In each case, the intertwisted filaments serve as a substrate for a layer of remanent magnetic material which is deposited thereon. While this layer of remanent magnetic material may conceivably be present on the substrate filaments prior to the weaving thereof, it is preferable to deposit the material on the substrate filaments after the weaving step in the fabrication process so that a closed loop magnetic path is provided having no air gaps and which extends around the elliptical cell to completely encase the segments of the two substrate filaments at each cell and bridge the minute gaps at the crossings of the two segments. In accordance with an aspect of the invention, the insulated electrical conductors in each cell may comprise four conductors, two each in the warp and weft directions. These may be utilized for coincident current storage in accordance with known methods by serving as X- and Y-coordinate select conductors, together with an inhibit conductor and a readout conductor. However, if preferred, only one conductor need be provided in each of the warp and weft directions, thus still permitting coordinate current selection while utilizing one of the conductors as a readout conductor for retrieving information from the matrix on a word-organized coincident current basis.

In another particular arrangement in accordance with the invention, a plain gauze weave is utilized wherein a plurality of warp filaments are intertwisted by pairs with a plurality of filaments running in the weft direction. In accordance with an aspect of the invention, each of the filaments in this arrangement is an insulated electrical conductor, with the surface of the insulation of one or both conductors of the intertwisted pair being treated so as to receive the layer of remanent magnetic material deposited thereon. In operation, current is selectively directed along one or both conductors of the intertwisted pair on which the magnetic material is deposited, as well as being directed along the weft conductors in order to control information storage and readout in a selected cell.

A better understanding of the present invention may be had from a consideration of the following detailed description, taken in conjunction with the accompanying drawings, wherein.

Figure 1:
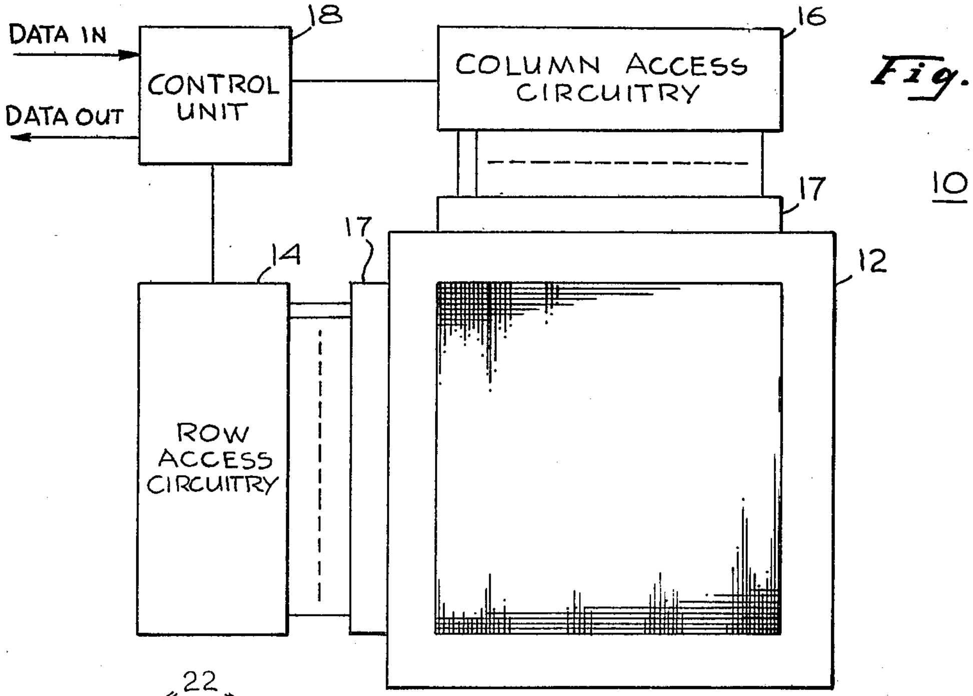
FIG. 1 is a diagram of a generalized information storage system showing a woven memory matrix in conjunction with associated control circuitry for operation thereof as a memory device.

As shown in FIG. 1, a typical system 10 for the utilization of apparatus in accordance with the invention may comprise a woven memory matrix 12, also sometimes referred to as a wire screen memory, connected to suitable access circuitry 14 and 16 via connectors 17. A control unit 18 is shown connected to the access circuitry 14, 16 to control the access circuitry by the selection of particular individual cells of the memory matrix 12 in accordance with data which is to be stored in the matrix 12 or in accordance with particular portions of the matrix 12 which are to be read out.

Figure 2:
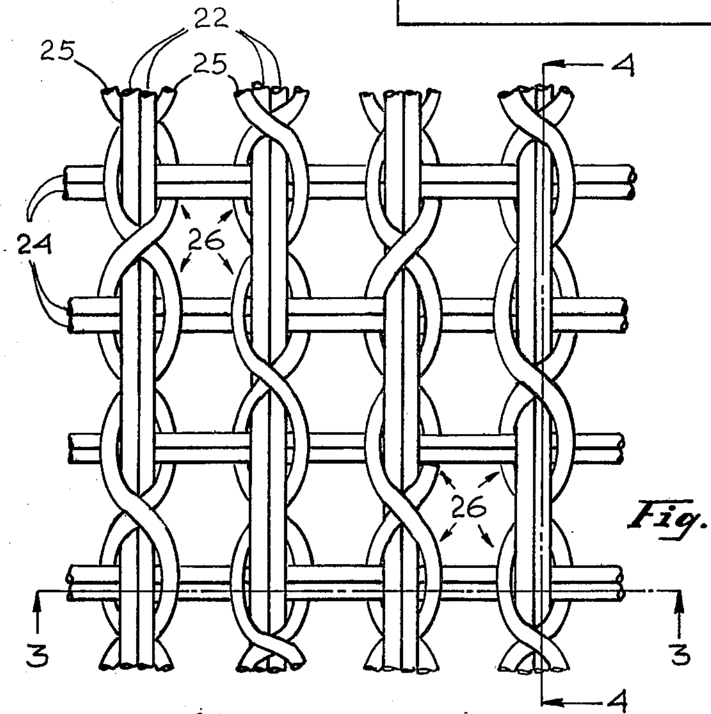
FIG. 2 is a view of a particular arrangement in accordance with the invention as it may be employed in the arrangement of FIG. 1.

FIG. 2 represents in enlarged detail a particular arrangement in accordance with the invention which may be considered as a portion of a matrix 12 for use in the arrangement of FIG. 1. In FIG. 2 a plurality of column conductors 22 (woven in the warp direction) are shown arranged with a plurality of row conductors 24 (woven in the weft direction) and locked in position by intertwisted pairs of substrate filaments 25 (also in the warp direction). The substrate filaments 25 may be considered to have deposited thereon a layer of remanent magnetic material which provides a closed loop magnetic path about each crossing of the column conductors 22 and the row conductors 24, thus defining an individual storage cell suitable for coincident current control. In the arrangement shown, each cell 26 has four insulated conductors 22 and 24 arranged to serve X- and Y-coordinate select conductors, inhibit conductors, and readout conductors. If desired, however, such cells 26 may have the conductors 22 and 24 woven in reentrant return paths on themselves and threading the individual cells 26 in opposite directions so as to produce the effect of two turns per cell for each individual X and Y select conductor. The mode of operating such an arrangement is to store information by energizing the X and Y select conductors and to read out information on a word-organized basis in one coordinate while employing the remaining coordinate conductor as a sensing conductor.

By comparison of an individual storage cell 26 with previously known cells fabricated on the basis of a plain weave pattern in which the closed magnetic loop of a cell comprises portions of four separate orthogonal filaments, the advantages of the present invention may be readily apparent. For example, a materially shortened loop path length is achieved with fewer gaps between substrate filaments which must be bridged by the magnetic layer, thus materially enhancing the operation of the resulting device. Moreover, there is less open spacing within the individual cell which is not occupied by control conductors, thus providing improved coupling between the magnetic storage layer and the control conductors threading the cell. The coupling between adjacent cells is minimized, there being no common coupling element between adjacent cells in the weft direction and only a small fillet between those adjacent cells in the warp direction. The depicted configuration permits tighter packing densities of the individual cells in a given matrix and effectively locks the respective control conductors 22 and 24 in place so that the spacing is closely controlled. In addition, because of this particular configuration in accordance with the present invention, the requirements for applying substantial tension to the various conductors during the weaving process are virtually eliminated, the the only tension control which is still required being confined to that placed on the substrate filaments 25, which in this particular arrangement in accordance with the invention do not carry current and therefore do not present a problem with respect to insulation rupture.

Figure 4:
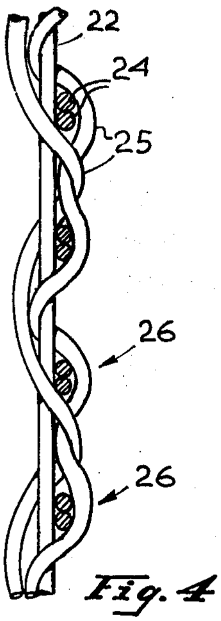
FIG. 4 is a sectional view of the arrangement of FIG. 2 taken along the line 4—4 thereof.
Figure 3:
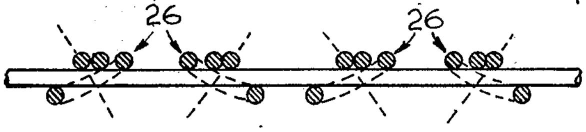
FIG. 3 is a sectional view of the arrangement of FIG. 2 taken along the line 3—3 thereof.

A further advantage accruing from the crossed weave configuration arises from the fact that the adjacent cells have axes which are non-parallel. This is provided by having one of the substrate filaments 25 threaded underneath the weft conductors 24 on opposite sides of the warp conductors 22 for adjacent cells 26. Also, the repetitive weave pattern cycle of the substrate filaments 25 is staggered by one cell from one column to the next, thus providing the described non-parallelism of the axes of adjacent cells along the weft direction as well as in the warp direction. This non-parallelism is better seen in FIGS. 3 and 4 which are, respectively, sectional views of FIG. 2 taken along the lines 3—3 and 4—4. The axes of the respective cells shown in FIGS. 3 and 4 are represented by dotted lines, and these are clearly directed at an angle to the normal of the plane of the woven matrix with the axes of adjacent cells directed along opposite angles from the plane normal.

In addition, there is complete freedom in selection of the direction in which a given control conductor, 22 or 24, threads a given cell 26. Such is not the case with previously known woven memory cells of the plain weave variety wherein a given conductor must thread adjacent cells in opposite directions in accordance with the limitations imposed by the plain weave pattern. Full advantage cannot be taken of available magnetic noise cancellation techniques in such a pattern where only a single matrix is involved.

Figure 5:
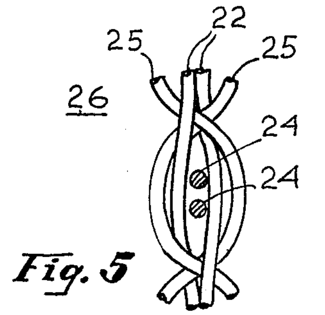
FIG. 5 is a view of a particular cell showing a configuration which may be realized in particular arrangements in accordance with the invention.
Figure 6:
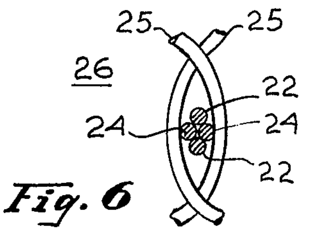
FIG. 6 is a view of another cell configuration which may be realized in particular arrangements in accordance with the present invention.

FIG. 5 shows the configuration of an individual cell which may be provided in a weave pattern such as that shown in FIG. 2 in which the warp conductors 24 are separated within an individual cell 26 so that the weft conductors 24 are directed between the warp conductors 22. This may provide a more compact distribution of the conductors 22 and 24 within the cell 26 so that the path length of the resulting magnetic loop about the substrate filaments 25 is reduced. Magnetic path length may be minimized, and packing density of the conductors 22 and 24 within the cell 26 increased, if the tension applied to the twisted substrate filaments 25 is increased during fabrication, resulting in the cell configuration appearing in FIG. 6. In this configuration, the conductors 22 and 24 are substantially parallel to each other at the point where they pass through the cell 26. Thus, the coupling between the conductors and the magnetic loop is a maximum in the desired direction of magnetization (clockwise or counterclockwise), thereby resulting in improved operating characteristics in a cell configuration in which the magnetic loop is automatically established at the minimum path length which is necessary to accommodate the number of conductors threading the cell.

Figure 7:
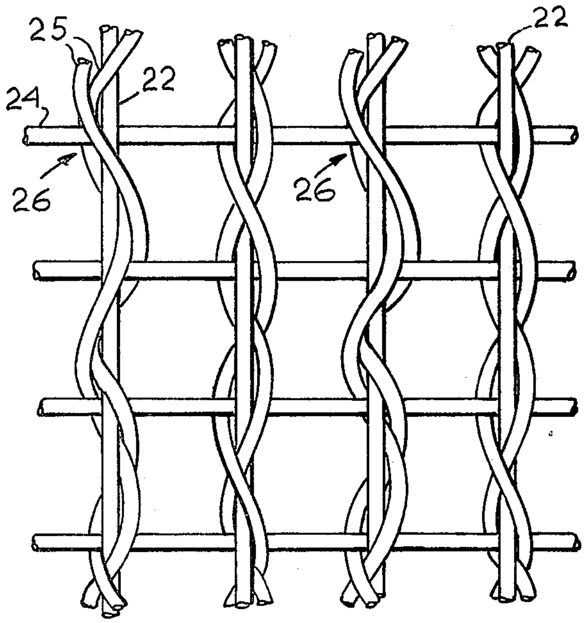
FIG. 7 is a view of a portion of another particular arrangement in accordance with the invention corresponding to that shown in FIG. 2.

FIG. 7 shows another crossed weave configuration in accordance with the invention which is similar to the arrangement shown in FIG. 2 but differs therefrom in that only single conductors 22 and 24 are provided to thread each individual cell 26 and also that the twisted substrate filaments 25 are respectively wound around the associated warp conductor 22 in a spiral fasion rather than alternating back and forth. This results in a matrix configuration in which adjacent cells develop a greater tilt with respect to the plane of the matrix than is provided in the configuration of FIG. 2. In operation, individual cells of the woven matrix of FIG. 7 are selected on a coincident current basis by the application of currents to the conductors 22 and 24 intersecting in the selected cell, and readout may be accomplished on a word-organized or coincident current basis by energizing selected column conductors 22 or row conductors 24 and sensing the readout pulses on the conductors in the remaining orthogonal direction. The resulting arrangement of storage cells in a woven matrix such as shown in FIG. 7 is represented schematically in FIG 8. It may be seen that the planes of the adjacent cells in either direction are substantially orthogonal to each other, thus resulting in a minimum of intercell interference and magnetic noise.

Figure 9:
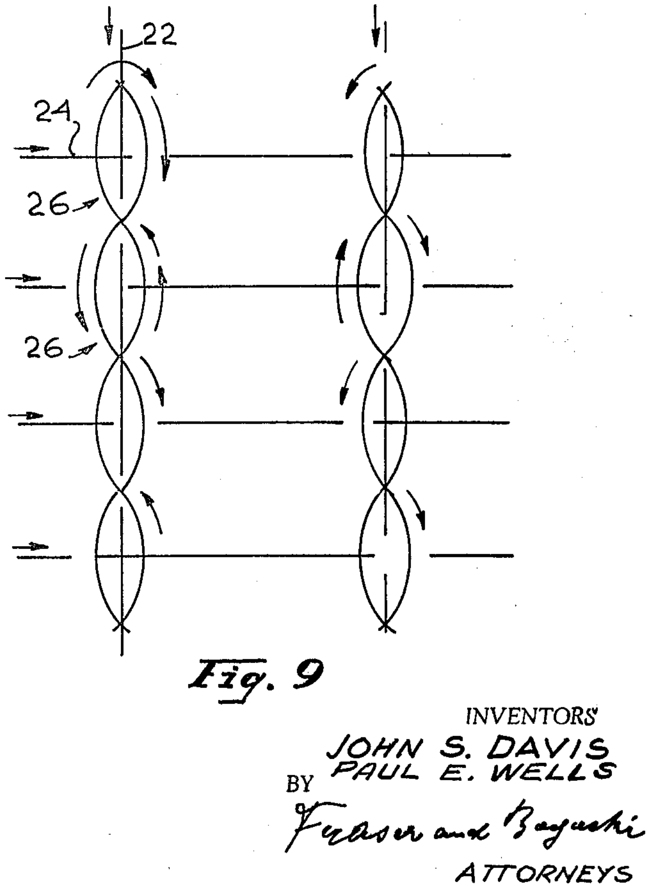
FIG. 9 is a diagram showing the relationship between drive currents and direction of stored magnetization conditions for particular arrangements in accordance with the invention.

FIG. 9 shows another arrangement for the crossed weave pattern of the present invention in which adjacent cells 26 are arranged to be threaded in opposite directions by the orthogonal control conductors 22 and 24. The arrows along the conductors 22 and 24 indicate the direction of current flow for storage of information in a selected cell 26, and the arrows about the magnetic loop of the cell 26 show the direction of magnetization and of remnant magnetic flux corresponding thereto. It will be noted that the magnetic flux of two adjacent cells 26 is directed in opposite directions for drive currents as shown with the particular weave pattern indicated. Thus, in the upper left-hand cell the direction of magnetization is clockwise, whereas in the cell immediately below the direction of magnetization is counterclockwise (for similarly directed drive currents). Such an arrangement results in a reduced interaction between adjacent cells and corresponding improvement in the signal-to-noise ratio during operation.

Figure 11:
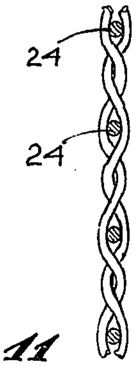
FIG. 11 is an edge view of the arrangement of FIG. 10.
Figure 10:
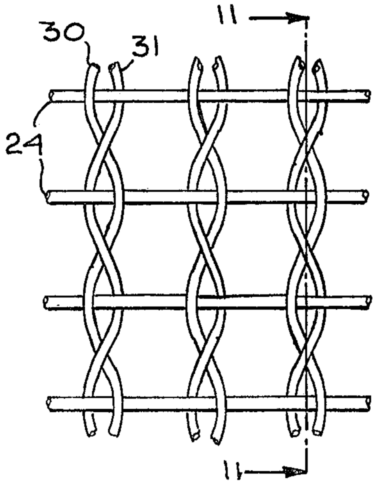
FIG. 10 is a view of another particular arrangement in accordance with the invention.
Figure 12:
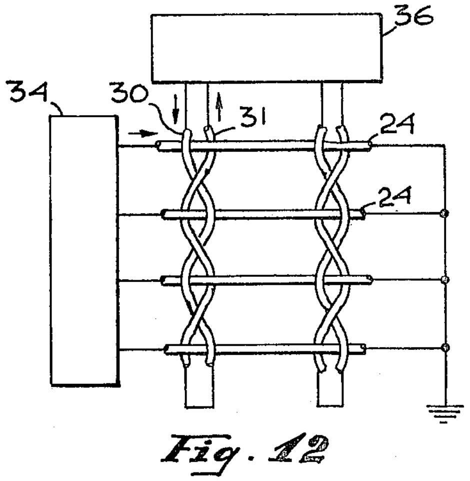
FIG. 12 is a simplified diagram of a control arrangement for operating the matrix of FIGS. 10 and 11.
Figure 13:
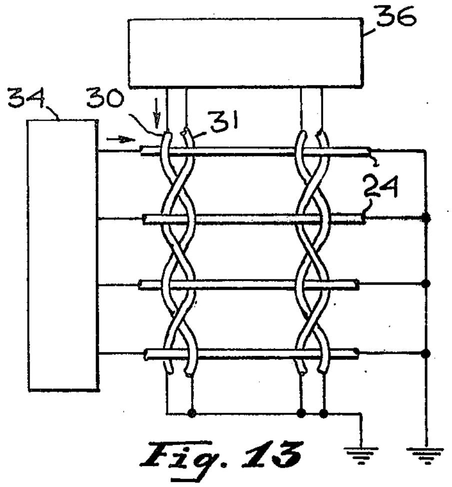
FIG. 13 is a simplified diagram of another control arrangement for operating the matrix of FIGS 10 and 11.

FIG. 10 is a diagram of still another particular arrangement in accordance with the invention, and FIG. 11 is a sectional view thereof taken along the line 11—11. In this particular configuration a plain gauze weave is utilized which results in perhaps the simplest crossed weave pattern which is possible. As shown, a particular column of storage cells is provided by twisting a pair of warp conductors 30 and 31 with each other and with weft conductors 24. A layer of remnant magnetic material may be deposited on the twisted pair of conductors 30 and 31, resulting in a plurality of cells each of which provides a closed magnetic loop threaded by a single conductor 24. Particular control arrangements for use with such a structure are represented in FIGS. 12 and 13. In operation, current is directed along the conductors 24 and also along the conductors 30 and 31 of the twisted pair on which the magnetic layer is deposited. Such a cell configuration and operation thereof in the manner described result in a stored magnetization condition which may provide nondestructive readout, that is, readout on a word-organized basis with the application of current to a selected conductor 24 providing a rotation of the stored magnetization condition which results in the presence of induced readout pulses on the conductors 30 and 31. The original storage condition is restored at the termination of the readout pulse on the conductor 24. One particular arrangement for driving the weave configuration shown in FIGS. 10 and 11 is illustrated in FIG. 12, in which access circuits 34 and 36 are coupled to the respective conductors 24, 30, and 31. Each intertwisted pair of conductors 30 and 31 is connected together at the lower end of the matrix so that the associated conductors 30 and 31 are connected in series. In FIG. 13, however, the filaments 30 and 31 are not connected in series and control may be effectuated by selectively applying currents individually to the leads 30 and 31 if desired. If only one lead 30 or 31 is to carry current, the other may be simply a nonconducting filament.

Figure 14:
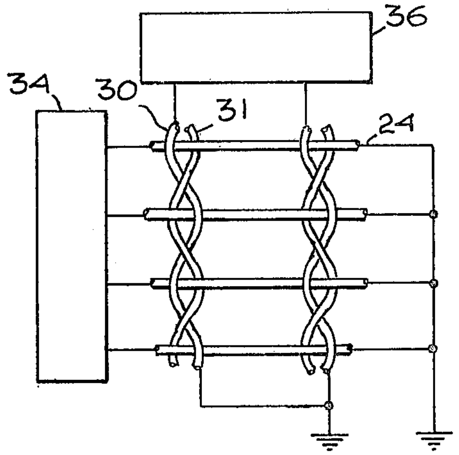
FIG. 14 is a simplified diagram of a particular variation of the crossed weave pattern of FIGS. 10 and 11 together with a control arrangement for operation thereof.

FIG. 14 shows still another arrangement in accordance with the invention applying a gauze weave pattern corresponding to that shown in FIGS. 10 and 11 but differing from the operating arrangements of FIGS. 12 and 13 in that the arrangement of FIG. 14 is provided with a deposit of remnant magnetic material on only one of each intertwisted pair of warp filaments 30 and 31. In this figure the magnetic layer is represented by a stippling appearing along the filament 30 which is an insulated conductor. The filament 31 is merely provided for the purpose of interlocking the insulated conductors 30 and 24 in the crossed weave pattern. The closed loop path for magnetic flux is provided about the insulated conductor 30 so that flux is stored in a cylindrically oriented direction relative to the conductor 30, rather than being longitudinally directed, as has been the case with the arrangements of FIGS. 12 and 13. Storage of an information bit is effectuated by selective energization of particular conductors 24 and 30 by appropriate drive currents to establish the desired magnetization condition. Readout may be accomplished by applying a current to a given lead 24 and sensing the signals induced on the leads 30 by the temporary rotation of magnetic flux in the associated storage cells. Control of the matrix in this manner is in accordance with the nondestructive readout mode of operation.

Figure 15:
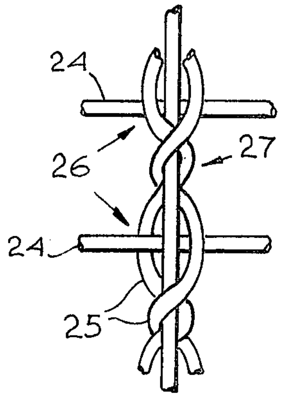
FIG. 15 is a diagram of a portion of a particular arrangement in accordance with the invention showing a particular pattern which may be utilized for providing buffer cells between adjacent storage cells along a warp conductor.

FIG. 15 shows a particular arrangement in accordance with an aspect of the invention wherein a twisted pair of substrate filaments 25 is shown with an additional twist developed between each pair of adjacent weft conductors 24 for the purpose of providing increased isolation between adjacent cells 26. The added twist serves to provide a buffer cell 27 between each adjacent pair of storage cells 26, thereby resulting in the complete elimination of any shared magnetic element between adjacent storage cells. The buffer cell 27 assists in controlling the spacing between adjacent storage cells 26, and thereby the packing density of the matrix. Additional buffer cells 27 may be provided at each buffer cell point if wider spacing of the storage cells 26 in the matrix is desired.

Figure 16:
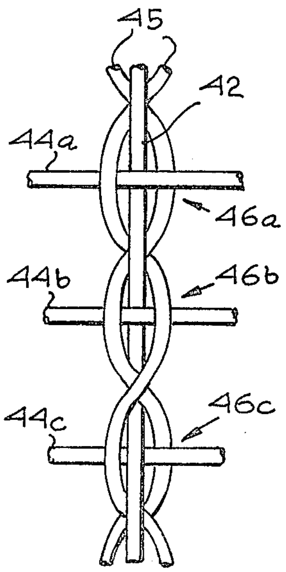
FIG. 16 is a view of a portion of one particular arrangement in accordance with the invention for providing selectively varied inductive coupling between control conductors as it may be employed in the arrangement of FIG. 1.
Figure 17:
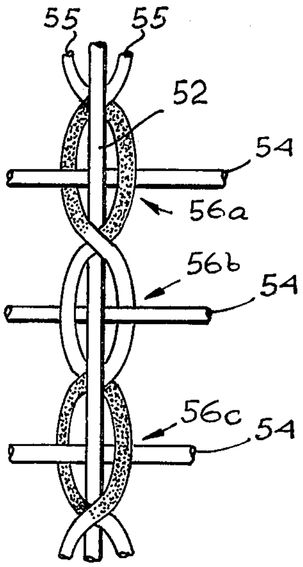
FIG. 17 is a view of a particular portion of another arrangement in accordance with the invention for providing variable inductive coupling between control conductors.
Figure 18:
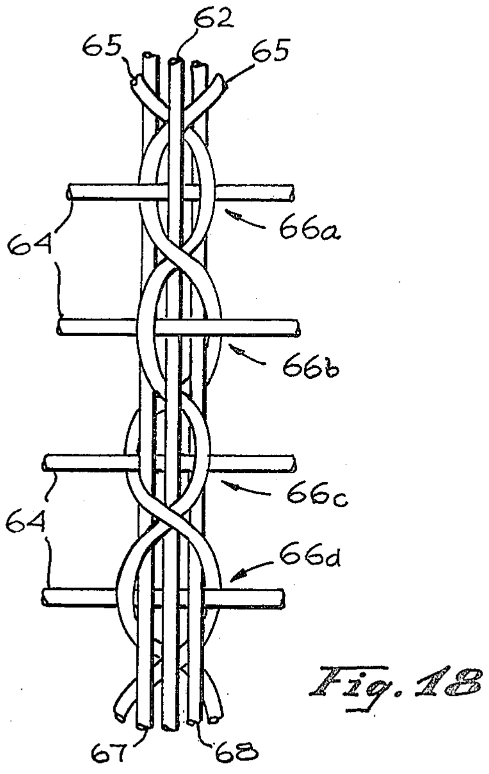
FIG. 18 is a view of still another arrangement in accordance with the invention for providing varied inductive coupling between control conductors.

FIGS. 16, 17, and 18 represent various cell configurations in accordance with the invention which may be employed for the purpose of providing a permanent memory operating by selective variation of inductive coupling between control conductors. Each of the depicted arrangements will be understood to be a portion of a typical matrix which may be operated as a memory device in accordance with the arrangement of FIG. 1. In the arrangement of FIG. 16, three cells **46*a*, 46*b*, and 46*c* are shown defined by a pair of intertwisted filaments 45 interwoven with shoot conductors 44*a*, 44*b*, and 44*c* and a warp conductor 42. Here it will be understood that saturable magnetic material, not necessarily possessing the property of magnetic remanence, is deposited on the filaments 45 to define closed loop paths about each of the cells 46*a*–46*c*. Information is stored during the fabrication process and thereafter maintained on a permanent basis by the selective determination of whether or not the shoot conductors 44 and/or the warp conductor 45 both thread a given cell 46. Thus, a binary 0 may be considered as stored in each of the cells 46*a* and 46*b* by virtue of the fact, although the shoot conductor 44*a* threads the cell 46*a*, the warp conductor 45 does not, and, while the warp conductor 45 threads the cell 46*b*, the shoot conductor 44*b* does not. In cell 46*c*, however, where both the shoot conductor 44*c* and the warp conductor 42 thread the cell, a binary 1 may be considered to be established. Readout or interrogation may be effectuated by driving one of the two orthogonal conductors, 42 or 44**, and observing the remaining conductor for evidence of an induced signal.

In FIG. 17 an arrangement is depicted wherein the mechanism for varying the inductive coupling between control conductors in an individual cell is the selective deposition of magnetic mateiral at the cells. Thus, a warp conductor 52 is shown interwoven with a plurality of shoot conductors 54, the arrangement being held together by an intertwisted pair of warp filaments 55. In this particular figure, the presence of magnetic material on the warp filaments 55 is indicated by stippling at the cells **56*a* and 56*c* to distinguish from the situation presented in the cell 56*b* which is not provided with a layer of magnetic material. The selective variation of magnetic material with respect to the cells in this manner may be achieved by masking in appropriate fashion during the deposition process or by deposition and then selective removal as by etching or sandblasting in accordance with known techniques. It will be noted that in the arrangement shown in FIG. 17 each of the conductors 54 and 52 threads each of the individual cells 56*a*, 56*b*, and 56*c*. Only in cells 56*a* and 56*b*, however, is significant inductive coupling provided between the conductors 52 and 54 by virtue of the deposited magnetic layer; in the cell 56*b*, which has no magnetic material, the coupling between the conductors 52 and 54 is negligible. Thus, the presence of a particular binary digit in a given cell may be ascertained by driving one of the conductors 52 or 54** and observing the results on the remaining conductor.

Still another arrangement for selectively controlling the variation inductive coupling between input and output conductors in a permanent memory is shown in FIG. 18. In this particular arrangement in accordance with the invention, a plurality of individual storage cells **66*a*–66*d* are individually defined by an intertwisted pair of warp filaments 65 woven to encompass orthogonal warp conductor 62 and shoot conductors 64. It will be understood that the intertwisted warp filaments 65 are coated with a layer of magnetic material to provide a closed loop magnetic path about each of the cells 66*a*–66*d*. Also shown are a pair of bias conductors 67 and 68 which are variously and selectively woven to thread particular ones of the individual storage cells 66 while by-passing others without threading. Selective application of bias currents to the bias conductors 67 and 68 results in a variable pattern of information storage which is available as desired on a permanent basis. For example, applying a suitable bias current to the conductor 67 serves to saturate the magnetic material of cells 66*c* and 66*d* which are threaded by the conductor 67. This serves to block the inductive coupling between conductors 62 and 64 which is normally provided by the saturable magnetic material of cells 66*c* and 66*d*. On the other hand, the inductive coupling between conductors 62 and 64 at the cells 66*a* and 66*b* is not blocked by the current of the bias conductor 67 because the conductor 67 does not thread either one of these cells. Interrogation of the matrix portion of FIG. 18 with application of a bias current to the conductor 67 will result in the binary readout 1100, reading from top to bottom, assuming the presence of inductive coupling to correspond to the storage of a binary 1. On the other hand, interrogation during the application of a bias current to the conductor 68 results in the readout 1010 because of the different pattern developed with the bias conductor 68 in the threading of the cells 66*a*–66*d*. It will be clear that additional bias conductors as desired may be provided in the manner already shown and described. Also the various bias conductors 67 and 68 may be utilized to control the matrix in accordance with the confluence of bias currents to develop still other information storage patterns. Similarly, means patterns of this type in accordance wtih the invention may be provided in the fabrication of a structure utilizing remanent magnetic material with the bias conductors 67, 68** being employed to inhibit the storage of particular binary states in selected cells or to establish a predetermined pattern of information storage from which a cycle of operation may be begun and which is convenient to restore in the event of an error from circuit malfunction or the like.

Figure 19:
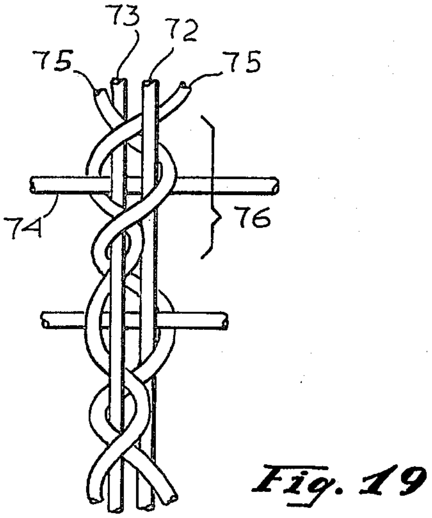
FIG. 19 is a view of a portion of still another arrangement in accordance with the invention for providing a particular nondestructive readout device for use in the matrix arrangement of FIG. 1.

FIG. 19 shows a portion of an arrangement for a crossed weave memory device in accordance with the present invention providing a particular type of nondestructive readout device. In this arrangement, a pair of warp filaments 75 are intertwisted to encompass orthogonal drive conductors 72 and 74 and an interrogate conductor 73 in a figure 8 configuration comprising a cell 76. Remanent magnetic material is deposited on the intertwisted filaments 75 to develop upper and lower loops for magnetic flux within the cell 76. It should be noted that the warp drive conductor 72 threads the upper loop of the cell 76 without threading the lower loop, whereas the interrogate conductor 73 threads the lower loop of the cell 76 without threading the upper loop. In this particular arrangement, the fillet of remanent magnetic material between the upper and lower loops of the figure 8 configuration of the cell 76 is made such that it saturates at a lower flux level than that of the remainder of the upper loop. Thus the flux from the upper loop is forced to traverse the lower loop, thereby providing a coupling between the two loops whereby a flux disturbance in one loop affects the flux condition of the other loop. Information is stored by applying drive currents to the conductors 72 and 74 on a coincident current select basis and nondestructive readout may be effectuated by applying an interrogate current to a given conductor 74 and sensing the presence or absence of a signal on the conductor 73 threading the lower loop of the cell 76. During readout, the presence of a current on the conductor 74 develops a momentary disturbance of the remanent flux condition in the lower loop of the cell 76, resulting in signals of opposite polarity induced on the conductor 73 depending on which of two binary states is stored in the cell 76. A given cell 76 may be interrogated repetitively in this fashion without destroying its stored information state.

Figure 20:
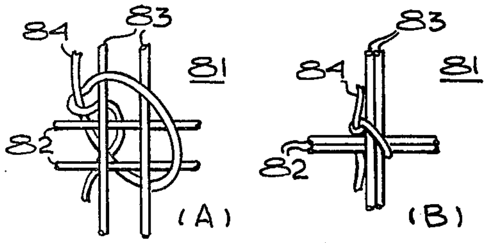
FIG. 20 is a view of a portion of an alternative configuration for realizing the memory structures of the invention.

FIG. 20 represents an alternative configuration for forming memory cells in accordance with the invention as described hereinabove. In this arrangement, a plurality of control conductors extending in orthogonal directions may be firmly anchored in position at the respective conductor crossings by an additional filamentary member which extends generally in the direction of one set of control conductors and which is knotted about the orthogonal control conductors at the respective cell positions to provide the substrate for the magnetic material to be deposited thereon. View (A) of FIG. 20 shows a given cell 81 having orthogonal control conductors 82 and 83 with a substrate filament looped about the conductors 82, 83. View (B) of FIG. 20 shows the cell 81 after the substrate filament 84 is drawn tight to fix the knotted loop about the conductors 82, 83 and establish the mesh defining the cell 81.

Although there have been described above particular arrangements of woven memory devices and methods of fabrication thereof in accordance with the invention for the purpose of illustrating the manner in which the invention may be used to advantage, it will be appreciated that the invention is not limited thereto. Accordingly, any and all modifications, variations, or equivalent arrangements falling within the true spirit of the present invention and defined by the annexed claims should be considered to be part of the invention.

The embodiments of the invention in which an exclusive property or privilege is claimed are defined as follows:

1. A magnetic memory in the form of a screen comprising a plurality of filamentary members, at least some of which are electrically conductive, intermeshed with one another to form a plurality of individual closed magnetic cells wherein each cell is defined by filamentary locking means running generally in a first given direction and completely surrounding and locking in place both a first electrically conductive filamentary member extending longitudinally in substantially the same direction as said locking means and a second electrically conductive filamentary member extending longitudinally at an angle to said first given direction; and a layer of magnetic material deposited on said filamentary locking means in order to provide a closed magnetic path surrounding both said first and second electrically conductive filamentary members.

2. A magnetic screen member comprising a plurality of filamentary members, at least some of which are electrically conductive, intermeshed with one another to form a plurality of individual closed magnetic cells wherein each cell is defined by a loop formed by one or more filamentary members which completely surround and hold locked together at least first and second electrically conductive members which pass through the loop in respective first and second longitudinal directions which are angularly disposed relative to one another.

3. A mesh memory structure comprising a plurality of filamentary members, at least some of said members being insulated electrical conductors, at least some of said members being looped and knotted to enclose others of said members, and at least some of said looped members being coated with a layer of magnetic material to provide information storage cells.

4. A mesh memory structure comprising a plurality of filamentary members, at least some of said members being insulated electrical conductors, at least some of said members being intertwisted by pairs in a crossed weave pattern to envelop others of said members, and at least some of said intertwisted members being coated with a layer of magnetic material to provide information storage cells.

5. A woven memory structure comprising a plurality of filamentary members, at least some of said members being insulated electrical conductors, at least some of said members being intertwisted by pairs in a crossed weave pattern to envelop others of said members, and at least some of said intertwisted members being coated with a layer of saturable magnetic material to provide information storage cells; and means for selectively varying the inductive coupling between the insulated electrical conductors of the cells.

6. A women memory structure in accordance with claim 5 wherein the means for selectively varying the inductive coupling between the insulated electrical conductors comprises a bias conductor interwoven with at least some of said cells and means for applying current to said bias conductor to selectively saturate the magnetic material of selected cells.

7. A woven memory structure comprising a plurality of filamentary members, at least some of said members being insulated electrical conductors, at least some of said members being intertwisted by pairs in a crossed weave pattern to envelop others of said members, and at least some of said intertwisted members being selectively coated with a layer of saturable magnetic material to provide information storage cells having a selective pattern of variation in inductive coupling from cell to cell.

8. A woven memory structure comprising a plurality of filamentary members, at least some of said members being insulated electrical conductors, at least some of said members being intertwisted by pairs in a crossed weave pattern to envelop others of said members, at least some of said intertwisted members being coated with a layer of saturable magnetic material to provide information storage cells, and said insulated electrical conductors being arranged to selectively thread said storage cells in order to vary the inductive coupling between the insulated conductors at the various cells.

9. A woven memory structure comprising a plurality of filamentary members, at least some of said members being insulated electrical conductors, at least some of said members being intertwisted by pairs in a crossed weave pattern to envelop others of said members, and at least some of said intertwisted members being coated with a layer of saturable magnetic material to provide information storage cells, certain of said insulated electrical conductors being threaded through only selected cells of the memory structure and arranged to carry a bias current for controlling the inductive coupling between the remaining conductors of said threaded cells.

10. A woven memory structure comprising a plurality of filamentary members, at least some of said members being insulated electrical conductors, at least some of said members being intertwisted by pairs in a crossed weave pattern to said others of said members, and at least some of said intertwisted members being coated with a layer of remanent magnetic material to provide information storage cells.

11. A woven memory structure in accordance with claim 10 wherein said layer of remanent magnetic material substantially encircles the intertwisted members to define closed loop magnetic flux paths respectively encircling said cells.

12. A women memory structure in accordance with claim 10 wherein an individual storage cell includes a portion of an insulated non-conducting filament and a portion of an insulated electrical conductor intertwisted to form a loop and a second insulated electrical conductor threading said loop, and further including means for providing drive currents along said insulated electrical conductors to selectively control the magnetization of a selected storage cell.

13. A woven memory structure in accordance with claim 10 wherein the intertwisted members of a given pair comprise insulated electrical conductors which are intertwisted to enclose additional insulated electrical conductors extending in a direction substantially orthogonal to the general direction of an intertwisted pair, and further including means for selectively applying electrical currents to said additional electrical conductors and to at least one of said intertwisted pair to selectively control the magnetization state of a selected storage cell.

14. A woven memory structure comprising a plurality of filamentary members, at least some of said members being insulated electrical conductors, at least some of said members being coated with a layer of saturable magnetic material to establish closed magnetic flux paths, each path comprising a pair of said conductors, said structure comprising a pattern including multiple control conductors extending at least one in each of two orthogonal directions and adapted for weaving on automatic looms utilizing only a single shuttle.

15. A woven memory structure comprising a plurality of filamentary members, at least some of said members being insulated electrical conductors, and at least some of said members being coated with a layer of remanent magnetic material, the coated members being intertwisted by pairs in a crossed weave and defining closed loops of magnetic material adapted for information storage.

16. A woven memory structure comprising a plurality of filamentary members, at least some of said members being insulated electrical conductors, and at least some of said members being coated with a layer of remanent magnetic material, the coated members being intertwisted by pairs in a crossed weave and defining closed loops of magnetic material, each loop encircling at least one conductor to provide a memory cell.

17. A woven memory structure comprising a plurality of interwoven filamentary members, at least some of said members being insulated electrical conductors, and at least some of said members being coated with a layer of remanent magnetic material, the coated members being intertwisted by pairs in a crossed weave and defining closed loops of magnetic material enclosing associated ones of said conductors, each closed loop comprising segments of only two coated members.

18. A woven memory structure comprising a plurality of insulated electrical conductors arranged in two groups substantially orthogonal to each other, the conductors within each group being substantially parallel to each other;

a plurality of substrate filamentary members intertwisted by pairs with the insulated conductors to hold the conductors in place; and a layer of remanent magnetic material coating the intertwisted substrate members to provide a plurality of closed loop magnetic paths.

19. A woven memory structure in accordance with claim 18 wherein said insulated conductors comprise warp and weft conductors and the filaments of an intertwisted pair traverse an associated warp conductor alternating back and forth from side to side thereof, one of said pair passing underneath the weft conductors crossing the associated warp conductor and the other filament of said pair passing over the weft conductors but under the first filament between said first filament and the associated warp conductor at each crossing with the first filament.

20. A woven memory structure in accordance with claim 19 wherein the warp and weft conductors are arranged respectively by pairs to provide separate X, Y readout and inhibit leads threading each of said memory cells.

21. A woven memory structure in accordance with claim 19 wherein both filaments of an intertwisted pair are wound continuously around the associated warp conductor in a spiral configuration, the two filaments crossing each other on opposite sides of the warp conductor at alternate succeeding positions between adjacent memory cells.

22. A woven memory structure in accordance with claim 19 further including means for controlling currents along said warp and weft conductors to establish the storage of particular information in the memory cells of said structure and to read out said stored information.

23. A woven memory structure in accordance with claim 19 wherein said coated members are so intertwisted with the associated warp and weft conductors that adjacent memory cells in a column along a particular warp conductor are oriented substantially orthogonally to each other.

24. A woven memory structure in accordance with claim 19 wherein the adjacent pairs of coated members are so intertwisted with the associated warp and weft conductors that adjacent memory cells along a given weft conductor are oriented substantially orthogonally to each other.

25. A woven memory structure in accordance with claim 19 wherein the coated members are so intertwisted with the associated conductors that the direction of magnetization for the storage of information is opposite in adjacent cells.

26. A woven memory structure in accordance with claim 19 wherein the substrate filaments are intertwisted to provide a buffer cell between adjacent memory cells along a given warp conductor.

27. A woven memory structure comprising:

a first plurality of insulated electrical conductors arranged substantially parallel to each other;

a plurality of filaments, at least some of which constitute a second plurality of insulated electrical conductors, intertwisted by pairs to encompass conductors of said first plurality in a gauze weave pattern;

a layer of remanent magnetic material coating the insulated electrical conductors of said second plurality to define information storage cells; and means for selectively applying currents to said first and second pluralities of conductors to control the magnetization states of the magnetic material at the respective cells in accordance with applied information and to read out information corresponding to said magnetization states.

28. A woven memory structure in accordance with claim 27 wherein said layer of remanent magnetic material is configured to provide closed loop paths for magnetic flux in a cylindrical mode extending about electrical conductors of said second plurality.

Figure 8:
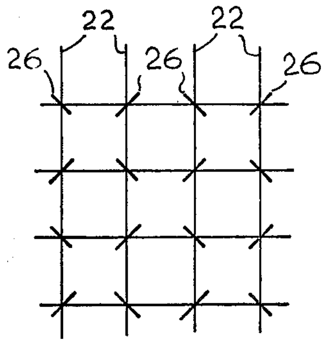
FIG. 8 is a schematic diagram presented to illustrate a particular cell orientation provided by arrangements in accordance with the invention.

29. A woven memory structure comprising:

a plurality of insulated electrical conductors extending in warp and weft directions;

a plurality of substrate filaments intertwisted by pairs to encompass said conductors to define a plurality of storage cells, each having two loops, certain of said conductors threading only the first of said loops and others of said conductors threading only the second of said loops in a given cell;

a layer of remanent magnetic material deposited on said substrate filaments to establish a figure 8 path for magnetic flux in each cell; and means for selectively energizing the electrical conductors to determine the storage state of a cell.

References Cited

UNITED STATES PATENTS

| | | | |
|---|---|---|---|
| 3,083,353 | 3/1963 | Bobeck | 340—174 |
| 3,154,769 | 10/1964 | Blades | 340—174 |
| 3,239,822 | 3/1966 | Davis et al. | 340—174 |
| 3,241,127 | 3/1966 | Snyder | 340—174 |
| 3,300,767 | 1/1967 | Davis et al. | 340—174 |
| 3,391,398 | 7/1968 | Matsushita | 340—174 |
| 2,910,673 | 10/1959 | Bloch | 340—174 |
| 2,934,748 | 4/1960 | Steinmen | 340—174 |
| 2,961,745 | 11/1960 | Smith | 29—155.5 |
| 2,985,948 | 5/1961 | Peters | 29—155.5 |

STANLEY M. URYNOWICZ, Jr., Primary Examiner

U.S. Cl. X.R.

29—604

UNITED STATES PATENT OFFICE

CERTIFICATE OF CORRECTION

Patent No. 3,495,225

February 10, 1970

John S. Davis et al.

It is certified that error appears in the above identified patent and that said Letters Patent are hereby corrected as shown below:

In the heading to the printed specification, lines 4 and 5, "Interco, Inc., a corporation of Maryland" should read -- The Bunker-Ramo Corporation, Oak Brook, Del., a corporation of Delaware --.

Signed and sealed this 17th day of November 1970.

(SEAL)
Attest:

Edward M. Fletcher, Jr.
Attesting Officer

WILLIAM E. SCHUYLER, JR.
Commissioner of Patents